(12) United States Patent
Wu

(10) Patent No.: US 9,716,837 B2
(45) Date of Patent: Jul. 25, 2017

(54) VIDEO/VISION BASED ACCESS CONTROL METHOD AND SYSTEM FOR PARKING OCCUPANCY DETERMINATION, WHICH IS ROBUST AGAINST ABRUPT CAMERA FIELD OF VIEW CHANGES

(71) Applicant: Xerox Corporation, Norwalk, CT (US)

(72) Inventor: Wencheng Wu, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 434 days.

(21) Appl. No.: 14/027,681

(22) Filed: Sep. 16, 2013

(65) Prior Publication Data

US 2015/0077549 A1 Mar. 19, 2015

(51) Int. Cl.
| | | |
|---|---|---|
| H04N 7/18 | (2006.01) | |
| H04N 5/232 | (2006.01) | |
| G06K 9/00 | (2006.01) | |
| G06K 9/62 | (2006.01) | |

(52) U.S. Cl.
CPC ..... *H04N 5/23296* (2013.01); *G06K 9/00771* (2013.01); *G06K 9/6202* (2013.01)

(58) Field of Classification Search
None
See application file for complete search history.

(56) References Cited

U.S. PATENT DOCUMENTS

| | | |
|---|---|---|
| 5,289,274 A | 2/1994 | Kondo |
| 5,764,163 A | 6/1998 | Waldman et al. |
| 6,285,297 B1 | 9/2001 | Ball |
| 6,967,569 B2 | 11/2005 | Weber et al. |
| 7,424,968 B2 | 9/2008 | Meyerhofer et al. |
| 7,726,888 B2 | 6/2010 | Amira et al. |
| 7,962,435 B2 | 6/2011 | Yu et al. |
| 8,306,734 B2 | 11/2012 | Mathews |
| 8,432,297 B2 | 4/2013 | Sonnabend et al. |
| 8,514,290 B2 | 8/2013 | Takeuchi |
| 2003/0014034 A1* | 1/2003 | Strobel ............... A61B 6/12 604/407 |
| 2003/0123703 A1 | 7/2003 | Pavlidis et al. |

(Continued)

FOREIGN PATENT DOCUMENTS

| | | |
|---|---|---|
| EP | 0 481 230 B1 | 1/1997 |
| EP | 0 707 229 B1 | 9/2001 |

(Continued)

OTHER PUBLICATIONS

Felzenszwalb, P. F. et al., "Object Detection with Discriminatively Trained Part Based Models," Pattern Analysis and Machine (2010) 32(9):1-20.

*Primary Examiner* — James M Anderson, II
(74) *Attorney, Agent, or Firm* — Kermit D. Lopez; Luis M. Ortiz; Ortiz & Lopez, PLLC

(57) ABSTRACT

Methods, systems and processor-readable media for parking occupancy determination. Changes in the field of view can be measured using template matching between templates derived from an original scene and a current scene with motion removed. The changes measured in the field of view can be employed to adjust data indicative of a region of interest for vision-based processing thereof if the changes measured are above a pre-determined threshold so that the impact of the changes with respect to the field of view to performance is minimized.

16 Claims, 12 Drawing Sheets

(56) References Cited

U.S. PATENT DOCUMENTS

| | | | |
|---|---|---|---|
| 2004/0202368 A1* | 10/2004 | Lee | G06K 9/00624 382/173 |
| 2006/0030985 A1* | 2/2006 | Lawida | G06K 9/3241 701/33.4 |
| 2006/0187305 A1* | 8/2006 | Trivedi | G06K 9/00234 348/169 |
| 2008/0051648 A1* | 2/2008 | Suri | A61B 6/481 600/407 |
| 2008/0253685 A1* | 10/2008 | Kuranov | G06T 3/4038 382/284 |
| 2009/0020233 A1 | 1/2009 | Berman et al. | |
| 2009/0021590 A1 | 1/2009 | Shimizu | |
| 2009/0052743 A1* | 2/2009 | Techmer | G06T 7/2033 382/107 |
| 2009/0279737 A1* | 11/2009 | Strens | G01T 1/295 382/103 |
| 2009/0322874 A1 | 12/2009 | Knutson et al. | |
| 2010/0085436 A1 | 4/2010 | Ohno | |
| 2010/0157049 A1 | 6/2010 | Dvir et al. | |
| 2011/0157358 A1 | 6/2011 | Bell | |
| 2012/0027248 A1* | 2/2012 | Feris | G06K 9/00744 382/103 |
| 2012/0284146 A1 | 11/2012 | Wong | |
| 2012/0326034 A1* | 12/2012 | Sachs | G06T 11/005 250/336.1 |
| 2013/0101171 A1 | 4/2013 | Bulan et al. | |
| 2013/0170696 A1 | 7/2013 | Zhu et al. | |
| 2013/0179383 A1 | 7/2013 | Pringle et al. | |
| 2013/0208134 A1 | 8/2013 | Hamalainen | |
| 2014/0098999 A1* | 4/2014 | U S | H04N 5/14 382/107 |
| 2014/0193032 A1* | 7/2014 | Zhang | G06T 3/0012 382/103 |
| 2014/0300686 A1* | 10/2014 | Campbell | H04N 5/23238 348/36 |
| 2014/0330132 A1* | 11/2014 | Raskin | A61B 5/02427 600/479 |
| 2015/0055821 A1* | 2/2015 | Fotland | G06K 9/3241 382/103 |

FOREIGN PATENT DOCUMENTS

| | | |
|---|---|---|
| EP | 1 465 414 A3 | 3/2005 |
| EP | 1 895 486 B1 | 11/2009 |
| EP | 2 079 062 B1 | 8/2010 |
| EP | 2 043 358 B1 | 5/2011 |
| WO | WO 2013/120180 A1 | 8/2013 |

* cited by examiner

VIDEO/VISION BASED ACCESS CONTROL METHOD AND SYSTEM FOR PARKING OCCUPANCY DETERMINATION, WHICH IS ROBUST AGAINST ABRUPT CAMERA FIELD OF VIEW CHANGES

FIELD OF THE INVENTION

Embodiments are generally related to parking management systems. Embodiments also relate to techniques for providing real-time parking occupancy data. Embodiments also relate to video and vision based image processing based on pre-defined regions of interest.

BACKGROUND

Parking management systems are being proposed that provide real-time parking occupancy data to drivers to reduce fuel consumption and traffic congestion. In the context of parking occupancy determination, a hybrid method of video-based and vision-based access control system has been developed, which utilizes restricted analyses in video and vision processing based on pre-defined regions of interest (ROIs) to gain the efficiency and accuracy needed for real-time application. An example of such a hybrid approach is disclosed in U.S. patent application Ser. No. 13/963,200 entitled "Hybrid Method and System of Video and Vision Based Access Control for Parking Stall Occupancy Determination," which was filed on Aug. 9, 2013, and is incorporated herein by reference in its entirety.

Like many video-based systems that rely on fixed camera field of view (FOV), however, a change of FOV can cause a significant performance drop. Methods are thus needed to deal with camera FOV changes in order to improve the performance of parking management and monitoring systems under disturbances such as abrupt camera FOV changes and camera shake.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved parking management methods, systems and processor-readable media.

It is another aspect of the disclosed embodiments to provide for methods, systems and processor-readable media for video/vision-based access control for parking occupancy determination, which is robust against abrupt camera FOV (Field of View) changes and/or against camera shake.

The aforementioned aspects and other objectives and advantages can now be achieved as described herein. Methods, systems and processor-readable media for parking occupancy determination are disclosed. Changes in the field of view can be measured using template matching between templates derived from an original scene and a current scene with motion removed. The changes measured in the field of view can be employed to adjust data indicative of a region of interest for vision-based processing thereof if the changes measured are above a pre-determined threshold so that an impact of the changes with respect to the field of view to performance is minimized.

An improved video-/vision-based access control method for parking lot occupancy determination, which is robust against camera field of view (FOV) changes, is thus disclosed. This can be achieved by first measuring/monitoring the camera FOV changes using template matching between templates learned from original scene(s) and the motion-removed current scene. The measured changes can then be employed to adjust the first ROI for vision-based processing, if the amount is above a pre-determined threshold. By doing so, the impact of camera FOV changes to the performance of the system is minimized and thus yields improvements against such a disturbance. In another embodiment, potential camera shake level parameters can be incorporated into the training of, for example, a vehicle-at-entrance classifier used for vision-based processing. Trajectory smoothing with respect to the output of vehicle tracking via video processing can then be implemented. By doing so, the impact of camera shake to the performance of the system is minimized, also yielding improved system performance against such a disturbance.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
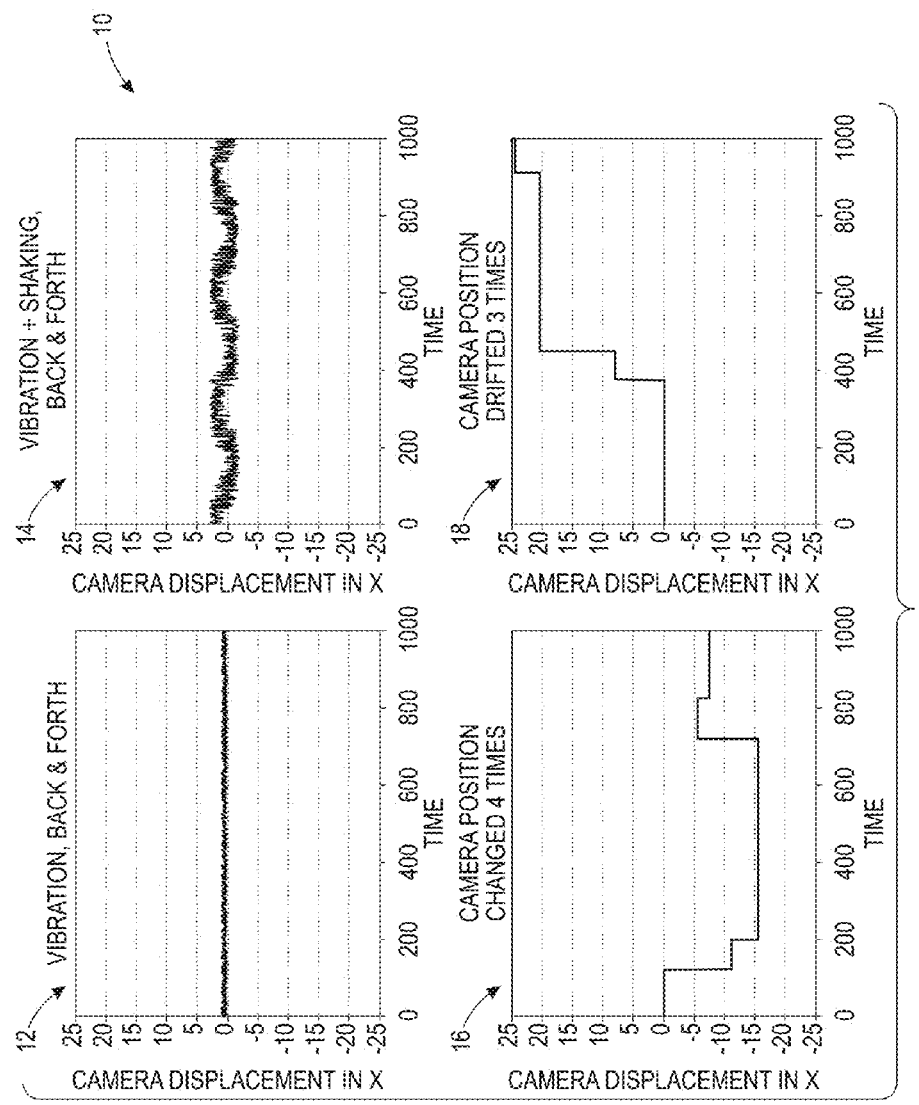
FIG. 1 illustrates a group of sample graphs depicting data indicative of two main types of camera FOV changes, including shaking/vibration and orientation changes.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

Throughout the following discussion, numerous references will be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium. For example, a server can include one or more computers operating as a web server, database server, or other type of computer server in a manner to fulfill described roles, responsibilities, or functions. Within the context of this document, the disclosed printers, assemblies, or space craft are also deemed to comprise computing devices having a processor and a non-transitory memory storing instructions executable by the processor that cause the device to control, manage, or otherwise manipulate the features of the assemblies.

Embodiments are disclosed describing and illustrating an improved video-/vision-based access control method for parking occupancy determination, which is robust against abrupt camera FOV (Field of View) changes. This can be achieved by first measuring/monitoring the camera FOV changes using template matching between templates learned from original scene(s) and the motion-removed current scene. The measured changes can then be employed to adjust the first ROI for vision-based processing, if the amount is above a pre-determined threshold. By doing so, the impact of camera FOV changes to the system performance can be minimized and thus yield an improved system against such disturbances.

Also disclosed are embodiments for video-/vision-based access control for parking occupancy determination, which is robust against camera shake. As will be explained in greater detail herein, potential camera shake level data and parameters can be explicitly included in the scope of training of, for example, a vehicle-at-entrance classifier (or other types of classifiers) for vision-based processing in trajectory smoothing with respect to the output of vehicle tracking information obtained from video processing operations. By doing so, the impact of camera shake to system performance can be minimized to yield improved system operations against such disturbances.

The embodiments discussed herein can be implemented in the context of hybrid video-based and vision-based access control systems. The disclosed approach can employ restricted analysis in video and vision processing based on pre-defined ROIs (Regions of Interest) to obtain the efficiency and accuracy required for real-time applications. Like many video-based systems that rely on the use of a fixed camera FOV, a change of FOV can cause significant performance drops in, for example, the above-mentioned video-/vision-based systems.

FIG. 1 illustrates a group of sample graphs 12, 14, 16, and 18 depicting data indicative of two main types of camera FOV changes, including shaking/vibration and orientation changes. Graphs 12, 14 depict data generally indicative of shaking and/or vibration. For example, graph 12 indicates a plot of camera one-dimensional displacement data, as an example, versus time to derive random vibration (back and forth) data. Graph 14 shows data indicative of random vibration and systematic shaking back and forth. Graph 16 plots data indicative of camera position changed over four intervals. Finally, graph 18 indicates that the camera position drifted three times.

The two main types of camera FOV changes are thus camera shaking/vibration and abrupt camera orientation/position changes. FIG. 1 illustrates a schematic illustration of the two categories. The key characteristic to watch for is the displacement differences between adjacent frames (not the amplitudes in the illustration). In the case of shaking/vibration, the displacement changes frame-to-frame. As a result, it is typically addressed via video stabilization (e.g., register frame-to-frame or every N frame) or via designing a system/method that is robust against it.

In the case of abrupt camera orientation/position changes, the displacements from frame to frame are typically the same except when those isolated disturbances occur. It is thus important to detect when these disturbances occurs and by how much. Though this can also be addressed via frame to frame registration, it may not worth such high frequency correction if the change is small at each occurrence but cumulated to a significant amount over a long period of time. Furthermore, high frequency correction is computational expensive and may introduce noise due to imperfect correction.

In practice, the camera FOV changes would likely exhibit both types with various degrees of severity. Different applications and system factors (such as algorithm used, configuration, environments, etc.) may require different strategy to cope with them. It is thus one of the objectives of the disclosed embodiments to address these robustness issues in the context of access control for parking occupancy determination.

Figure 2:
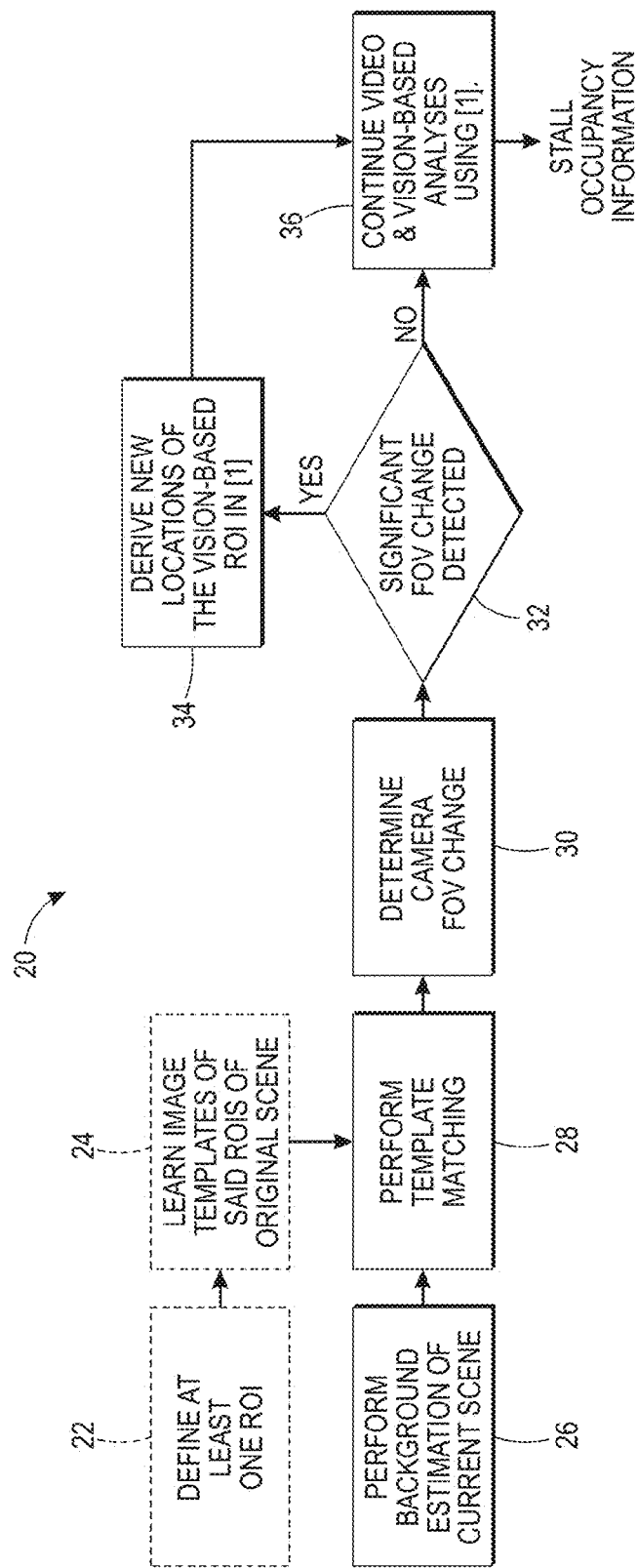
FIG. 2 illustrates a flow-chart of operations depicting logical operational steps of a video-/vision-based access control method for parking occupancy determination, which is robust against abrupt camera FOV changes, in accordance with a preferred embodiment.

FIG. 2 illustrates a flow-chart of operations depicting logical operational steps of a video-/vision-based access control method 20 for parking occupancy determination, which is robust against abrupt camera FOV changes, in accordance with a preferred embodiment. As indicated at block 22, a step or logical operation can be implemented to define at least one ROI. Thereafter, as disclosed at block 24, an operation can be implemented to learn image templates of the ROIs of an original scene. Additionally, as disclosed at block 26, a background estimation of a current scene can be performed followed by a template matching operation as shown at block 28. Note that the template matching operation can be performed with respect to the data generated as a result of the operations depicted at block 24 and 26. Following processing of the operation shown at block 28, a step or logical operation can be implemented to determine a camera FOV change as shown at block 30. Then, as shown at decision block 32, an operation can be implemented to determine if a significant FOV change is detected. If so, then as indicated at block 34, an operation can be performed to derive new locations, including a correction of potential offsets, shearing, scaling, rotation, and other geometric transformations observed of the vision-based ROI. If not, then as shown at block 36, video and vision based analysis can be continued. Parking occupancy (e.g., parking stall occupancy) data can then be determined.

The method 20 shown in FIG. 2 thus offers improved video and vision based access control for parking occupancy determination, which is robust against abrupt camera field of view (FOV) changes. The approach shown in FIG. 2 can also be summarized as follows:

1. Define at least one region of interest (ROIs) suitable for image registration (e.g. regions with distinct features or low likelihood of image content change over time, etc.) [can be performed offline];
2. Automatically learn representative image templates of the ROI(s) representing various image contents of the original scene [can be performed offline, updated online if desired];
3. Perform background estimation of current frame to yield image representing the motion-removed image content of current scene; [performed online, can reuse video processing steps disclosed, for example, in U.S. patent application Ser. No. 13/963,200];
4. Perform template matching between learned templates of the original scenes and the motion-removed current scene to find the best matches at a pre-determined schedule (e.g. every 5 minutes) [performed online];
5. Determine the amount and/or characteristics of the camera FOV changes if the template matching scores above a pre-determined threshold [performed online];
6. Derive the new pixel locations of the vision-based ROI if the determined amount exceeds a pre-determined threshold. If not, leave the pixel locations unchanged [performed online]; and
7. Continue the video and vision-based analyses as disclosed, for example, in U.S. patent application Ser. No. 13/963,200, [performed online].

Figure 3:
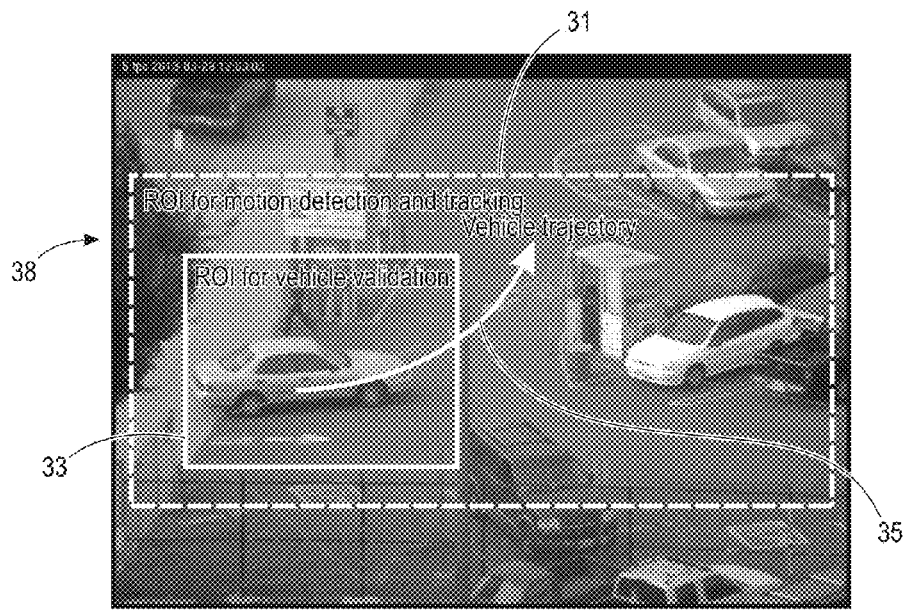
FIG. 3 illustrates a sample image depicting vision-based ROI (Region of Interest) and video-based ROI data, in accordance with an embodiment.

FIG. 3 illustrates a sample image 38 depicting vision-based ROI and video-based ROI data, in accordance with an embodiment. The image 38 shown in FIG. 3 contains two boxes 31 and 33. The inner box 33 is labeled "ROI for vehicle validation" and the outer box 31 is labeled "ROI for motion detection and tracking". The example image 38 shown in FIG. 3 depicts a vehicle entering a parking lot. An arrow 35 in image 38 indicates the general trajectory of the vehicle. FIG. 3 illustrates how a hybrid vision-based and video-based system such as that disclosed, for example, in U.S. patent application Ser. No. 13/963,200, functions. In general, activities occurring at the entrance of a parking lot can be monitored to determine the occupancy of the particular parking lot depicted in image 38. Two ROIs can be pre-defined offline: a vision-based ROI ("ROI for vehicle validation" of box 33) and a video-based ROI ("ROI for motion detection and tracking" of box 31). A vision-based classifier can be pre-trained with data collected from the site (e.g., the parking lot) and human labeling can be implemented to determine two classes: a class with the vehicle inside ROI 33 or a class without the vehicle inside ROI 33. At run-time, when motion is detected with the ROI 33, for example, the classifier can be employed to determine if a vehicle(s) is at the entrance. If yes, video processing can be performed at the video-based ROI 31 for motion detection and/or tracking.

Finally, the vehicle trajectory indicated by the arrow shown in FIG. 3 can be analyzed to determine if the event constitutes a vehicle entering the lot or exiting the lot. If the camera FOV changed noticeably, the image content of ROI 33 may change significantly enough that the pre-trained classifier fails. As a result, the system may miss some vehicle entering or exiting events thus cause inaccuracy of the system. On the other hand, the change of camera FOV has a smaller impact on tracking because motion detection is accomplished frame-to-frame. Thus, the system can quickly recover from abrupt camera FOV change. It is thus important to build additional robustness into the vision-based process, but not the video-based process under this type of disturbances.

Returning now to the operation shown at block 22 of FIG. 2, wherein at least one region of interest (ROIs) suitable for image registration (performed offline, updated online if desired), in this step at least one region of interest (ROIs) can be defined within the camera field of view, which is suitable for image registration. Note that the ROI(s) can be defined independently without any relationship with the vision-based ROI 33 and/or video-based ROI 31. There are different criteria for defining the ROI(s) and such criteria can serve different purposes. In general, it should contain some distinct features such as atypical colors, texture, edges, and has low likelihood of image content change over time, etc. In the context of parking management, areas with temporary traffic flow (e.g., entrance and driving paths/aisles, etc.) are acceptable, while parking stalls are not preferred (since different vehicles may park there for an extended period of time). The image 40 shown in FIG. 4 depicts a few suitable examples for such a purpose.

Figure 4:
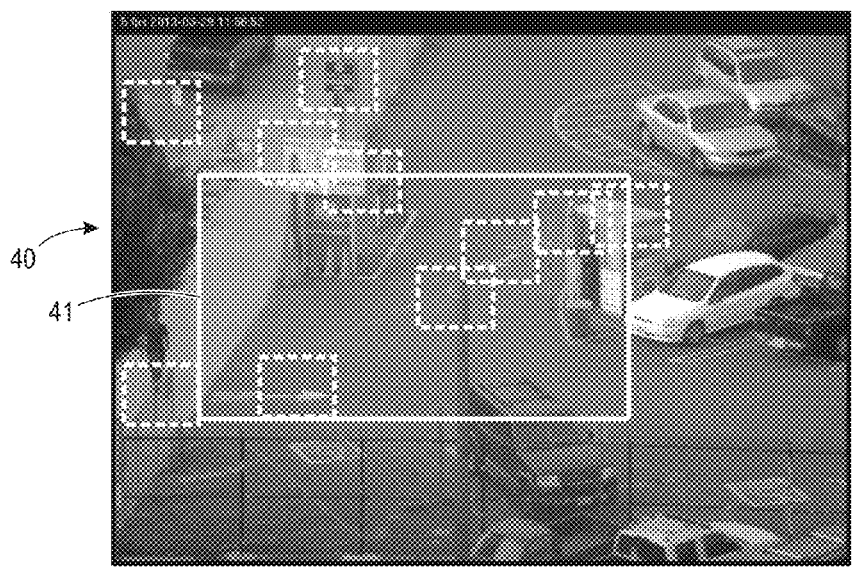
FIG. 4 illustrates a sample image of candidate ROIs, which can be utilized for assessing camera FOV changes, in accordance with an embodiment.

FIG. 4 illustrates a sample image 40 of candidate ROIs, which can be utilized for assessing camera FOV changes, in accordance with an embodiment. In the scene in FIG. 4, if only one ROI is selected, the larger region or box 41 is preferred (since it is larger thus more robust against noises). If more ROIs are selected, a preferred approach can involve the selection of evenly distributed ROIs such as a union of those regions (e.g., the smaller boxes shown in image 40 of FIG. 4). In the latter case, robustness can derive from the use of multiple ROIs. One only needs to perform this step once (optionally, update infrequently if scene changes significantly) and offline if camera configuration is fixed for the applications.

Figure 5:
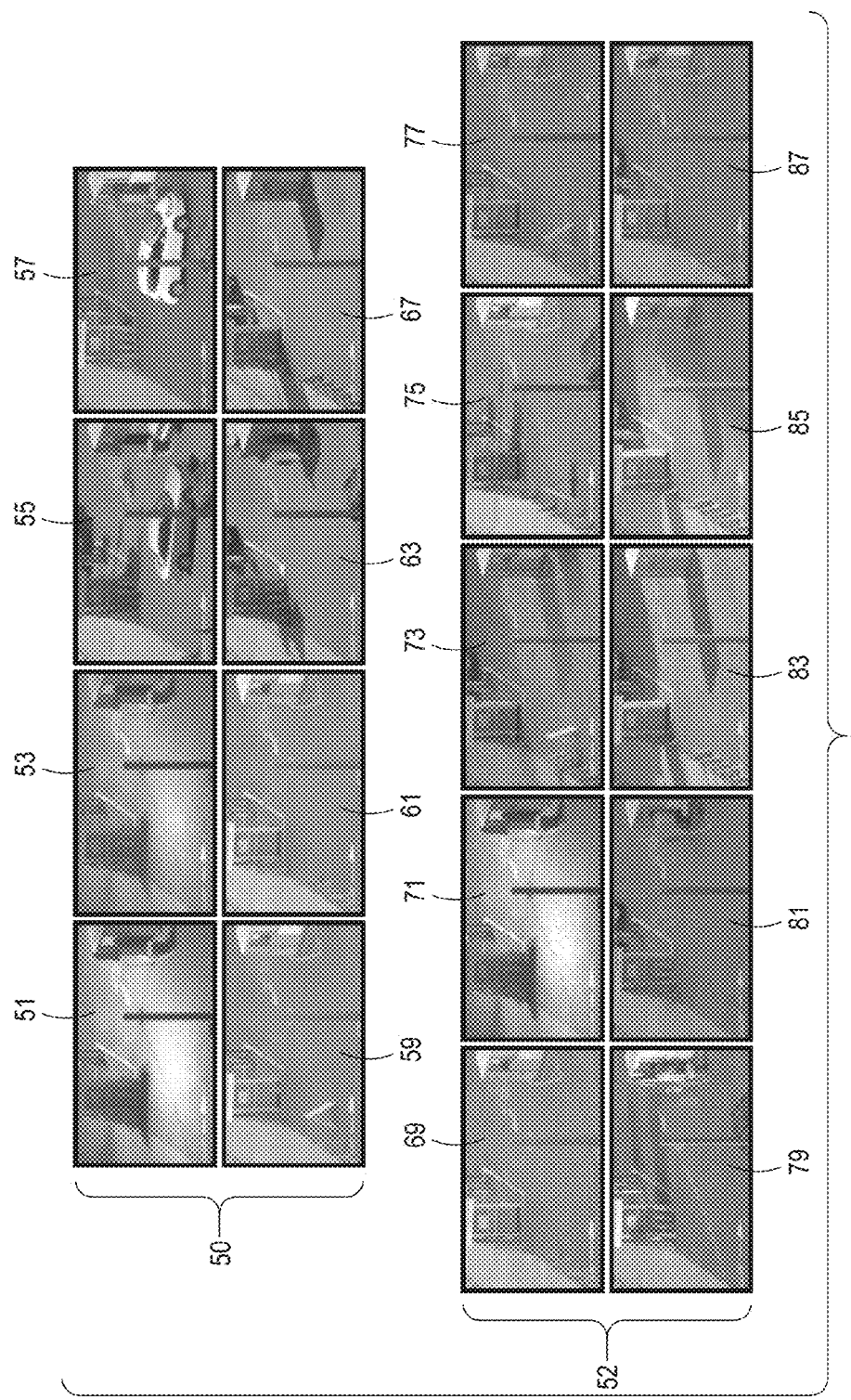
FIG. 5 illustrates samples images depicting automated learned image templates, in accordance with an embodiment.

FIG. 5 illustrates respective groups 50, 52 of sample images depicting automated learned image templates, in accordance with an embodiment. FIG. 5 is depicted herein to offer some context for the step or logical operation of block 24 shown in FIG. 2, which involves automatically learning representative image templates of the ROI(s) representing various image contents of the original scene [i.e., offline, updated online if desired].

In this step, image templates of the ROI(s) representing various image contents of the original scene can be learned automatically. The image content of a given ROI of the original scene is not fixed because: (1) illumination changes throughout the day; (2) at any given time there is a chance that objects (e.g., vehicles) may enter the ROI temporarily; and (3) there are systematic scene changes for some sites.

The group 50 of images shown in FIG. 5 depicts some examples for the larger ROI box 41 shown in FIG. 4. Group 50 includes pairs of images 51, 53 and 55, 57 and 59, 61 and 63, 67. The first pair of images 51, 53 of the group 50 shown in FIG. 5 depicts the impact of illumination. The second pair of images 55, 57 shows the impact of a vehicle, which temporarily appears in the ROI. The third pair of images 59, 61 shows an example of systematic scene changes due to the protocol of this site. The last pair of images 63, 67 depicts a mix of illumination change (shadows) and systematic scene changes. The group 52 of images shown in FIG. 5 includes images 69, 71, 73, 75, 77 and 79, 81, 83, 85, 87.

Due to these variations/complications, the system may require motion removal and multiple image templates to represent each ROI for the site. It is a labor-intensive and difficult effort for human operators. Therefore, a methodology or algorithm can be implemented, which automatically scans through a set of videos (e.g., 4-day of videos) and determines how many templates to keep based on the similarities among them. This approach can involve the following operations.

A set of videos can be selected which represents the original scene i.e. the intended Camera FOV). As an example, assume the first four days of videos of a particular site are selected immediately following camera installation. A few frames of these videos can be manually sparsely examined to ensure no visible camera FOV changes for those days.

For each video, a simple localized background estimation method can be run via an averaging of M=50 frames locally to create a near motion-free version of frame-k using, for example, $$B(i, j; k) = \frac{1}{M} \sum_{i=1}^{M} I(i, j; k + l).$$

This can be accomplished for k=1, N+1, 2N+1, . . . , i.e., for every N frames (e.g., N=3000 corresponds to 10 min for 5-fps video). The grayscale image of each ROI can then be pulled from these motion-removed frame-k as candidate image templates. The near motion-free frame-k can also be obtained by another method, for example: $B(i,j;k)=\alpha B(i,j;k-1)+(1-\alpha)I(i,j;k)$. This particular approach is likely to be more suitable for online processing in which every frame may need to be processed anyway for occupancy determination. It may not be as suitable for the offline step since the simple localized background estimation method only needs to examine M/N (e.g., 1/60) of the frames in each video rather than all frames.

Among these candidate image templates, only a small fraction need to be kept and can be selected automatically via the following iterative process: keep the first template remained, assess the similarities between the rest of the remaining templates and this kept template, if the similarity is above a predefined threshold remove this template, if not keep it in the pool of remaining templates, and repeat this process until no template left in the pool of remaining templates. As a simple example, assume we begin with 500 candidate templates. The 1$^{st}$ template can be kept and then similarities computed between this template and the remaining 499 templates. Assume also that 199 of the templates have similarities above the threshold and are removed. We now have 300 templates left and one template kept. Among the 300 templates, the 1$^{st}$ template is kept (adding it to the kept pool, now we have two kept) and similarities computed between this template and the remaining 299 templates. Let us assume that all 299 of the templates have similarities above the threshold and were removed. We thus stop and end with two templates. By the nature of our method, no two templates in our kept pool will have similarities above the pre-defined threshold. Hence, this approach allows one to automatically select representative templates that are sufficiently distinct.

Optionally, image templates with undesired stationary objects can be removed manually. Although this is a process to create near motion-free frames, there are rare cases where a vehicle stops at an entrance for more than, for example, 10 seconds (e.g., to allow the driver to view signage displaying parking fees/rates). It is thus still beneficial to have a human operator to manually remove undesired stationary objects via visual inspection of this automatically selected small set of image templates.

Note that the group 52 of images shown in FIG. 5 generally illustrates resulting templates processed at a pilot site. Normalized cross-correlation was employed in this example as the similarity metric and the threshold used was 0.98 for removing "duplicate" templates.

The operation discussed earlier with respect to block 26 involves performing background estimation of current frame to yield image representing the motion-removed image content of current scene (e.g., performed online, can reuse steps of, for example, U.S. patent application Ser. No. 13/963,200). At run-time as video frame streams in, a background estimation of current frame can be performed to yield one or more images representing the motion-removed image content of current scene. The same background estimation method discussed previously can be used (i.e., $B(i,j;k)=\alpha B(i,j;k-1)+(1-\alpha)I(i,j;k)$ for re-use and for its efficiency.

Alternatively, other background estimation methods such as moving average of the most recent M frames or Gaussian Mixture Modeling, etc., can be employed as well. This image can then be employed for image registration when needed. By doing so, the impact of motions that are not relevant to camera FOV change on image registration accuracy can be minimized. This also increases the chance of detecting camera FOV change earlier since image registration can still be performed accurately while a moving vehicle is present in the ROI.

The template matching operation discussed earlier with respect to block 28 of FIG. 2 involves performing template matching between learned templates of the original scenes and the motion-removed current scene to find the best matches at a pre-determined schedule (e.g., every 5 minutes). This operation can be performed online.

In this step, a standard gray-scale template matching algorithm can be applied using normalized cross-correlation as the similarity metric. That is, at run-time each image template can slide against the motion-removed current frame and a location determined, which yields the highest normalized cross-correlation value. This can be accomplished with respect to all image templates. The final score is the highest value across the highest value of each template. The final matched location is the corresponding location that yields. Alternatively, the templates matching may be applied in a feature space rather than in the (gray-scale) image intensity space.

For example, the image templates may be converted into a template set of interest points along with their corresponding feature description using methods such as SIFT, SURF, Harris corners detection, etc. During the matching phase, first interest points are detected in the motion-removed current frame using corresponding detection method for the feature space (e.g., SIFT). Then the corresponding feature description (e.g., SIFT) of these detected interest points are matched with the template set to find correspondence. In this case, the final matched location can be derived based on the coordinates of those match interest points (e.g., through SIFT-matching) and a distortion/image-registration model (e.g., a model including offsets, scaling, shearing, rotation, and projective transform, etc.).

It is not necessary to keep track of which template yields the match, but it can be stored if needed for diagnostics or smoothing. Given that this method aims to address abrupt camera position changes rather than camera shaking/vibration, this image registration can be performed online for every K frames (e.g., K=1500, 5 min for 5 frame per second video) rather than every frame. This results in a trade-off that is made in order to maintain real-time performance for the parking occupancy determination system in which the disclosed approach may be embodied.

The logical operation of block shown in block 30 of FIG. 2 generally involves determining the amount/characteristics of the camera FOV changes if the template matching scores above a pre-determined threshold [online]. In this step, the amount/characteristics of the camera FOV may change if the template matching score is above a pre-determined threshold. If not, it can be assumed that the camera FOV change is the same as what has been assessed most recently (i.e. the same amount/characteristics from the last confident template matching).

In the demonstration site shown in FIG. 4, for example, only one ROI was employed (e.g., the larger box 41 in image 40 of FIG. 4) and an assumption made that the camera shift model is x-translation and y-translation only (i.e. has offsets but no scaling, shearing, rotation, or projective transform). If more ROIs are selected, a higher order model can be employed (e.g., RANSAC: Random Sample Consensus procedure can be used to derive robust model parameters in these cases). The present inventors have found this simple translation-only model to perform satisfactory for the aforementioned demonstration site and is efficient for this application. Note that under this translation-only model assumption, the amount of camera FOV changes relative to the initial state is simply the pixel location (average) differences between the image registration result(s) and its (their) original location(s).

As discussed earlier, the step or logical operation shown at block 34 of FIG. 2 involves deriving the new pixel locations of the vision-based ROI if the determined amount exceeds a pre-determined threshold. If not, pixel locations unchanged are left unchanged. In this step, if the determined amount of camera FOV change exceeds a pre-determined threshold (i.e. the detected change is significant), new pixel locations of the vision-based ROI can be derived based on the detected change. In the case of a translation-only model assumption, we simply shift the new pixel locations of the vision-based ROI by the amount of translation detected.

To prevent introducing unnecessary adjustment of the vision-based ROI, the compensation of pixel locations are not changed if the detected change does not exceed a pre-determined threshold (e.g., 5 pixels) since the last assessment of camera FOV changes. Other strategies such as temporal smoothing or weighted sum, etc., can also be employed, but the present inventors have found that this simple update rule performs sufficiently well for applications of interest.

The final step shown in FIG. 2 can involve continued processing of the video and vision-based analysis disclosed in, for example, U.S. patent application Ser. No. 13/963,200. This step can be preferably performed online. In this step, the process of video and vision-based analyses for parking occupancy determination can be continued using the adjusted pixel locations of the vision-based ROI.

From a high-level view, the disclosed embodiments offer pre-processing of method capable of validating whether the vision-based ROI shown in FIG. 3, for example, is valid and compensates if it is not valid due to camera FOV changes. This is critical for a few reasons: (1) the vision classifier trained and used has the responsibility to trigger the video-based object tracking, and if it is not valid, the system may miss vehicle entering or exiting events, and (2) even if it may not miss an event, the timing of the triggering may not be as expected if it is not valid, and this may cause non-ideal tracking and trajectory-type classification later on. Both factors are highly relevant to the system performance. Real data from a pilot site is discussed below to confirm these expectations.

Figure 6:
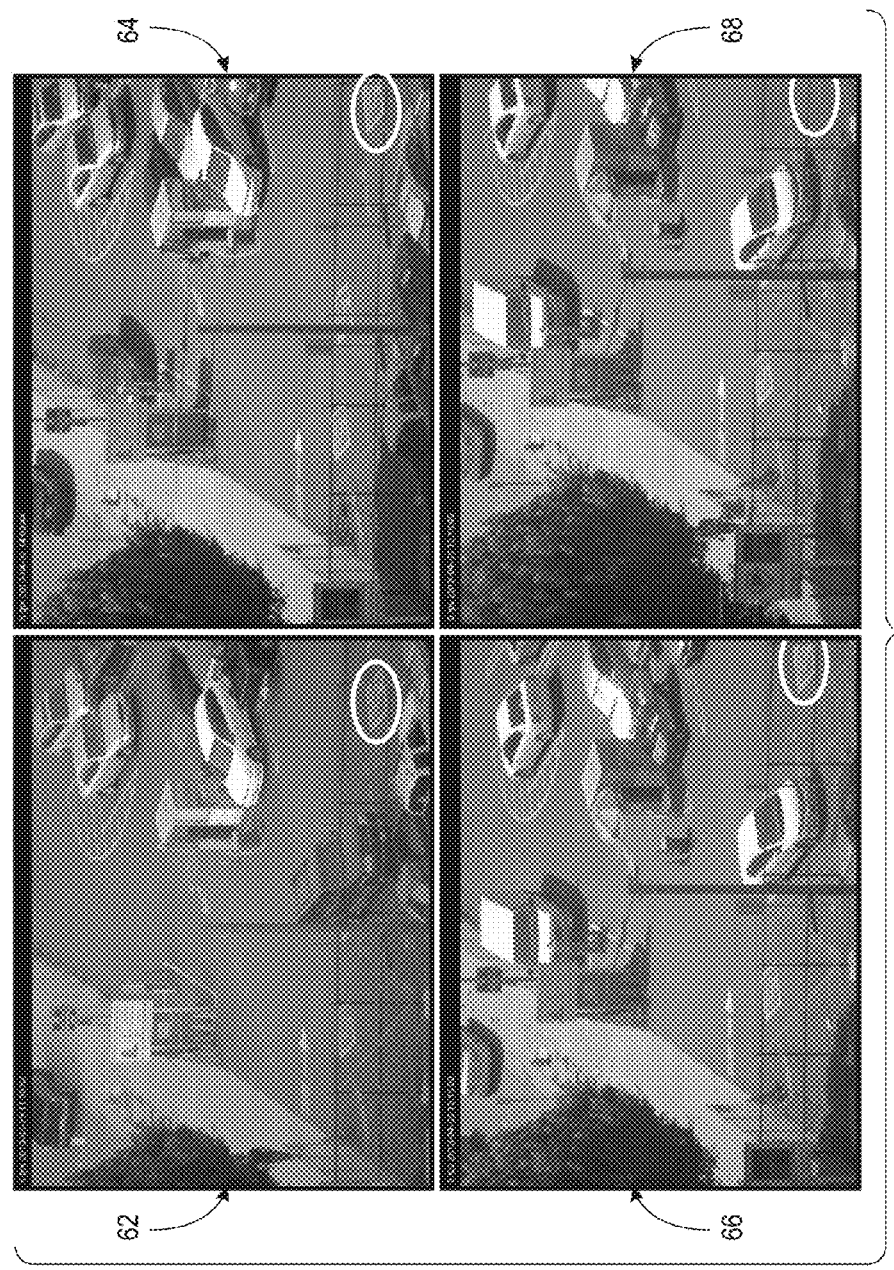
FIG. 6 illustrates sample images depicting scenes corresponding to an original scene, a first shift to the right, a second shift to the right, and a third shift to the right, in accordance with an embodiment.

FIG. 6 illustrates sample images 62, 64, 66, 68 depicting scenes corresponding to an original scene, a first shift to the right, a second shift to the right, and a third shift to the right, in accordance with an embodiment. The disclosed approach was applied to 12 collected videos acquired at a pilot site (e.g., a parking lot). These videos typically have a length of 16 hours (from 3:00 AM to 7:00 PM). All test videos are labeled with ground-truth by a human operator indicating by frame number where an event of interest started (vehicle enter or exit the lot) so that the disclosed methodology could be assessed.

An experimental video analysis system was implemented in MATLAB and tested with respect to the aforementioned test videos. Before showing the result, here are some descriptions of the "experiment". The 12 videos were collected/recorded daily from Mar. 29, 2013 to Apr. 9, 2013. This section is really about solving real situations encountered in our pilot site rather than an "experiment". FIG. 6 shows the camera FOV near each actual FOV change occurs due to unknown reason (likely due to loose mounting of camera). These events were first noticed due to a significant drop of performance and later detected/labeled by human operator after examining these recorded videos (human ground-truth). Ground-truth and measured camera FOV shifts using the disclosed approach with respect to these events are shown in Table 1. Note that our algorithm can be more accurate than human ground truth since it employs an image registration technique that takes into account image intensity. Nonetheless, the differences are small. It would become apparent later that our method is very effective for the purpose of improving the system performance against these camera FOV changes.

Figure 7:
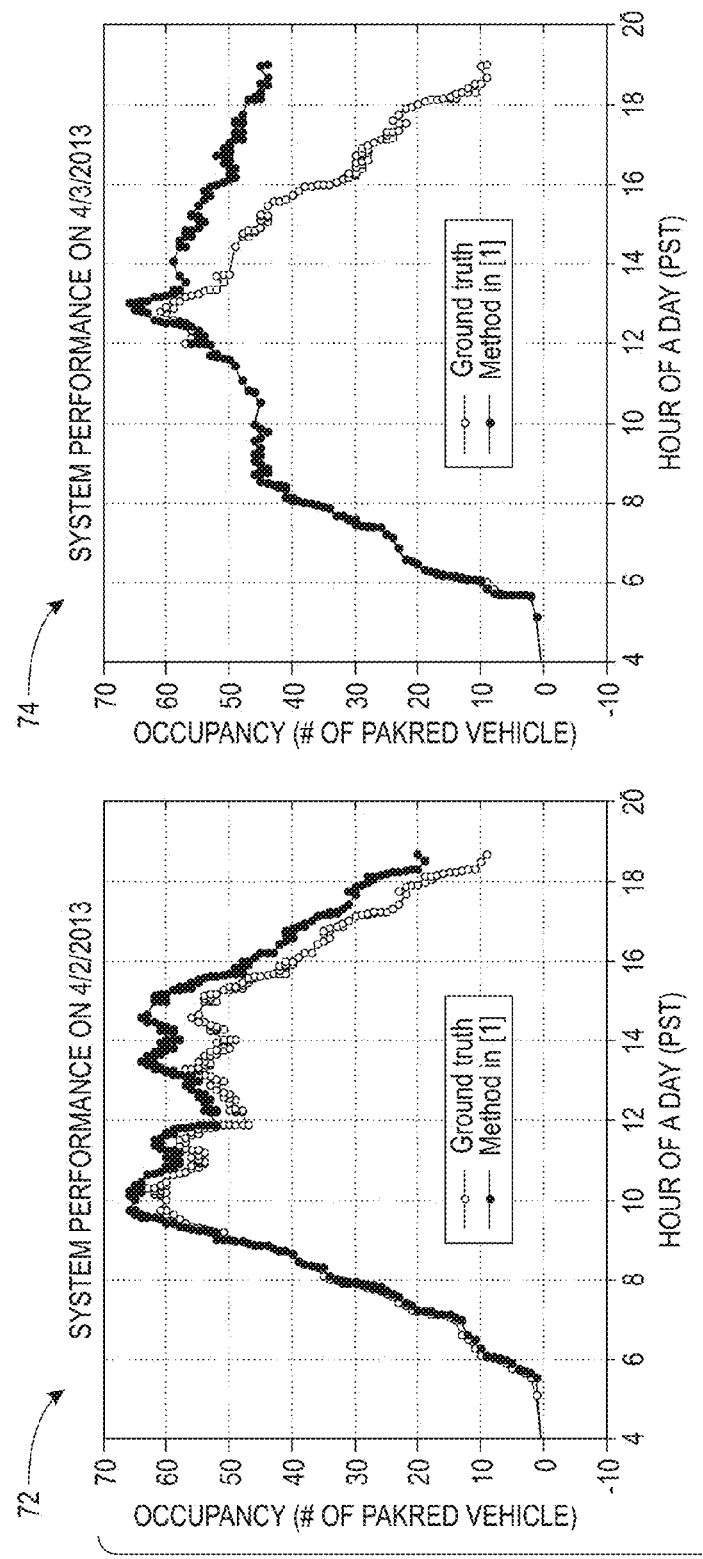
FIG. 7 illustrates a group of sample graphs depicting original system performance, in accordance with an embodiment.

FIG. 7 illustrates a group of sample graphs 72, 74 depicting original system performance, in accordance with an embodiment. FIG. 7 shows the original system performance on Apr. 2, 2013 and Apr. 13, 2013, respectively. Since the compensation preprocessing proposed here is not used, the performances were degraded significantly on Apr. 3, 2013 and are no longer acceptable. Here the original system refers to the method disclosed in U.S. patent application Ser. No. 13/963,200.

Figure 8:
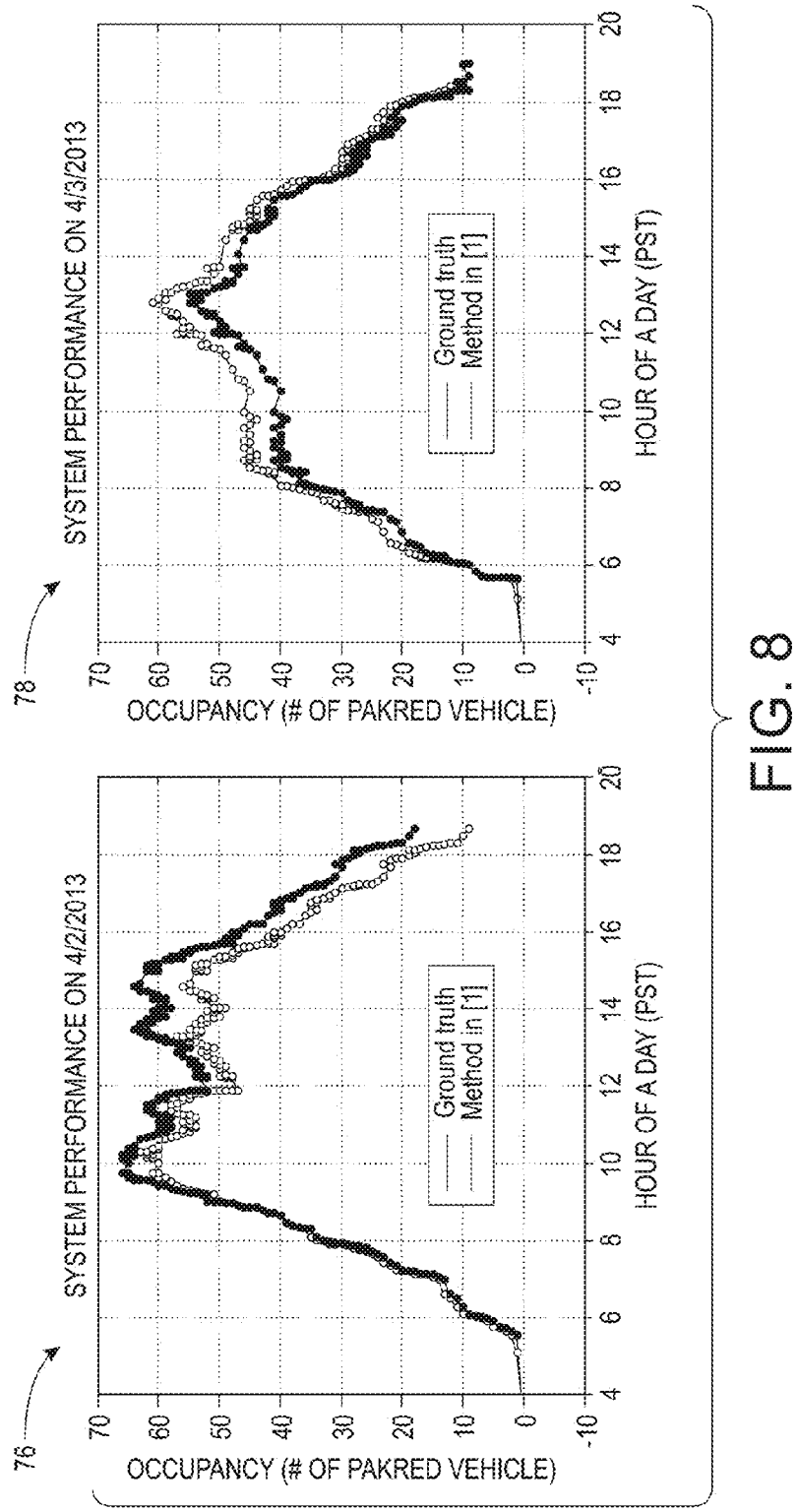
FIG. 8 illustrates a group of sample graphs depicting enhanced system performance, in accordance with an embodiment.

FIG. 8 illustrates a group of sample graphs 76, 78 depicting enhanced system performance, in accordance with an embodiment. FIG. 8 demonstrates the system performance with the addition of our proposed compensation preprocessing for vision-based ROI over a particular period of Apr. 3, 2013 and Apr. 13, 2013, respectively. When the amount of FOV changes exceeds some threshold (e.g., somewhere between 50 to 100 pixels), the original system breaks down. Here, the enhanced system refers to the method disclosed herein. It can be appreciated that the period of Apr. 3, 2013 and Apr. 13, 2013 is referred to herein for illustrative purposes only. Other periods can also be studied, for example, the 12-day period shown with respect to FIG. 9 as discussed in greater detail below.

Notice that the FOV changes experienced in this particular site were systematically to the right (i.e. the original vision-based ROI becomes too much to the left if without compensation). As a result, the uncompensated ROI location would bias to favor vehicle entering detection. This is evidential in our results where the original system breaks down in capturing the event of vehicle leaving the parking lot later in a day. With our compensation strategy, this was effectively corrected.

Figure 9:
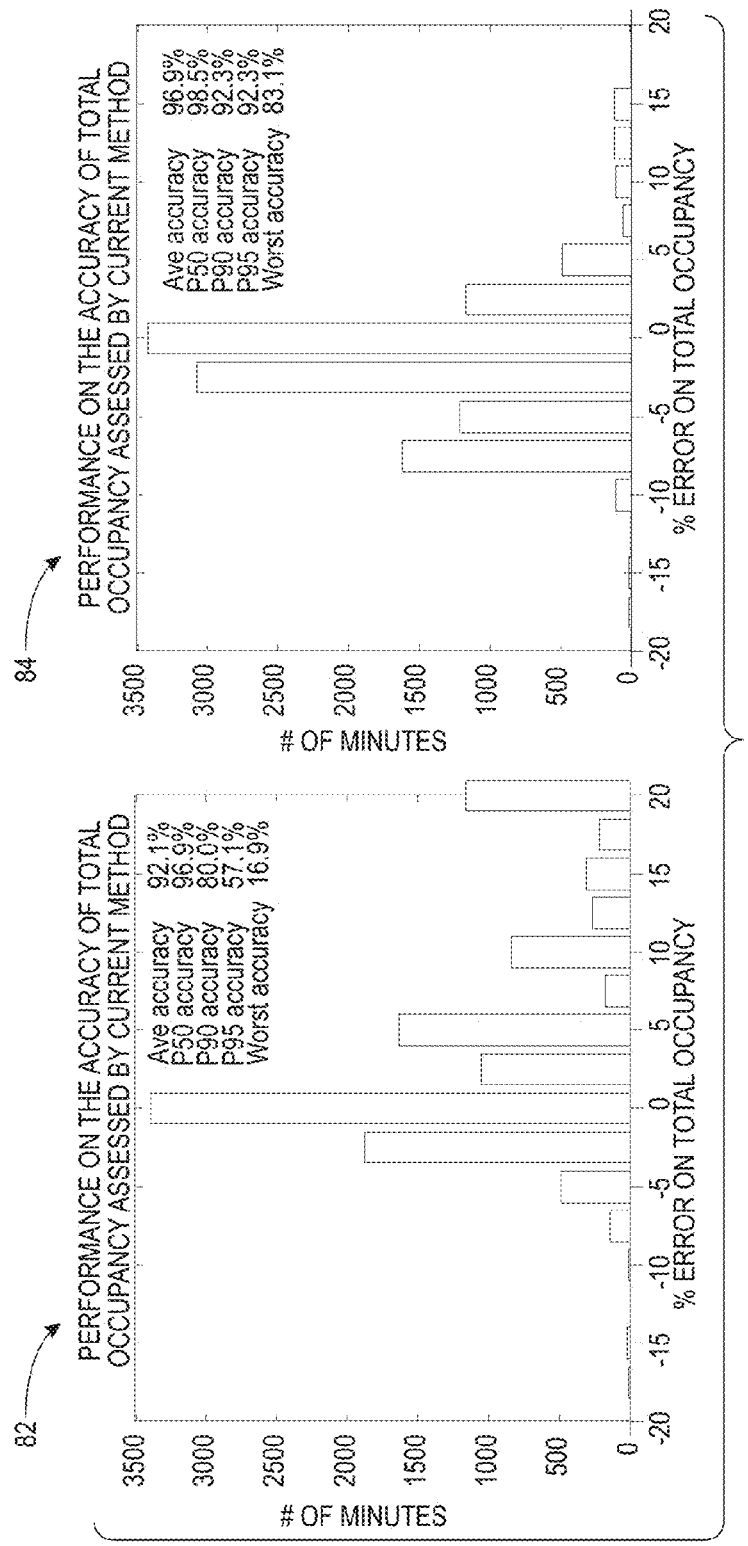
FIG. 9 illustrates sample graphs depicting overall system performance with respect to prior art approaches and the new approach disclosed herein.

FIG. 9 illustrates sample graphs 82, 84 depicting overall system performance with respect to prior art approaches and the new approach disclosed herein. FIG. 9 shows the overall system performance over the 12-day period of the prior method (graph 82) and the new method disclosed herein (graph 84). The improvement is clear. Note that in FIG. 9, system performance statistics have been gathered every minute during a 12-day daily recording. It can be appreciated, of course, that the 12-day period discussed with respect to FIG. 9 is indicated for illustrative purposes only. A different number days can be implemented to analyze performance.

TABLE 1

Accuracy of measuring camera FOV changes using proposed method

| Date/Time | Camera FOV Shift w.r.t original score | Description | Measured from our proposed method | Difference |
|---|---|---|---|---|
| Mar. 29, 2013 09:10:17 EST | (0, 0) | Start of recording, original scene | (0, 0) | (0, 0) |
| Apr. 2, 2013 14:03:44 EST | (−7, 50) | First noticeable shift to the right | (−3, 52) | (4, 2) |
| Apr. 3, 2013 15:15:53 EST | (−3, 54) | Second noticeable shift to the right | (−3, 52) | (0, 2) |
| Apr. 3, 2013 15:16:45 EST | (−13, 128) | Third noticeable shift to the right (biggest) | (−9, 119) | (4, −9) |

Clearly, the methodology here can be applied for diagnostics alone without compensation. This would be more limited. However, if PTZ (Pan-Tilt-Zoom) cameras that can be remotely adjusted are deployed for this application, the disclosed approach can serve as a tool to discover such issue and even guide human operators to remotely re-position the camera back to its original scene. Also, when the FOV changes too drastically, no compensation can remedy the issue; and thus repositioning of the camera may be the only solution. The disclosed approach offers a technique that (1) compensates the FOV changes when possible and (2) alerts human operators when excessive FOV change has been observed.

Though we learn several image templates automatically and apply them for image registration with equal importance, it is possible to further keep track of the time of the day of each template and use that additional information to perform image registration in a more selected manner. For example, if the current time is 3 AM, it is probably sufficient to perform image registration with only the $2^{nd}$ template from top-left to bottom-right shown in the group of images 52 of FIG. 5 since this is the template that was extracted from a scene from early in the morning. There are broader applications for this approach if implemented at monitoring mode such as on-street parking, other surveillance system using fixed camera. The compensation to the changes, however, may not be applicable for other applications.

Figure 10:
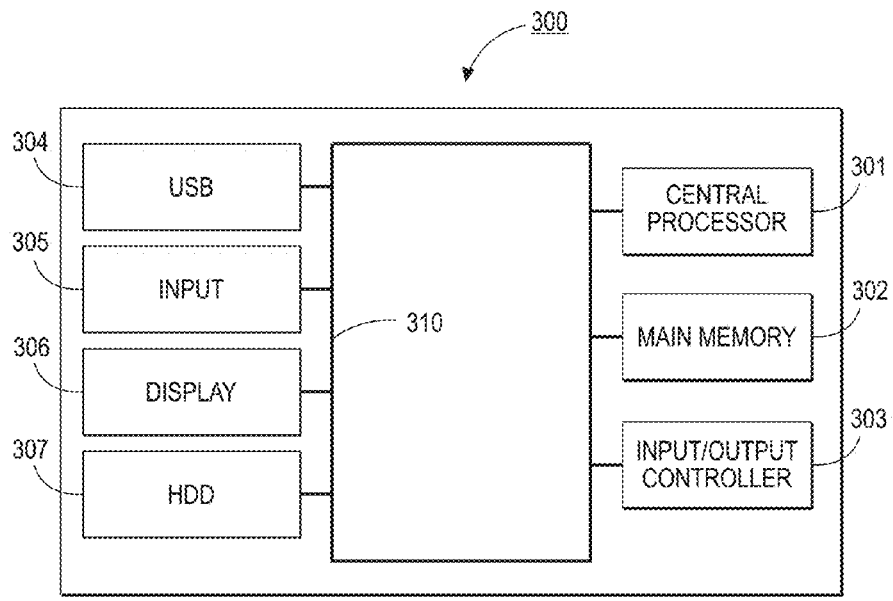
FIG. 10 illustrates a schematic view of a computer system, which can be implemented in accordance with one or more of the disclosed embodiments.
Figure 11:
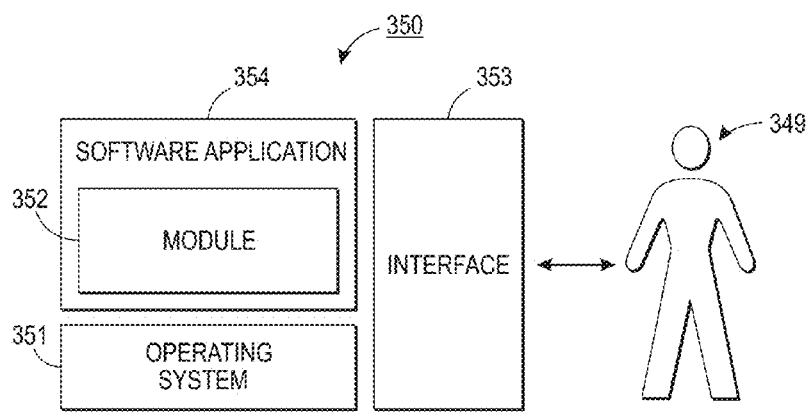
FIG. 11 illustrates a schematic view of a software system including an anomaly detection module, an operating system, and a user interface, in accordance with one or more embodiments.

FIGS. 10-11 are provided as exemplary diagrams of data-processing environments in which embodiments of the present invention may be implemented. It should be appreciated that FIGS. 10-11 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments. Note that FIGS. 10-11 generally illustrate a data-processing system in which embodiments may be implemented (e.g., such as an "app"). FIGS. 10-11 are thus representative of a variety of different types of data-processing systems and devices including, for example, servers, laptop computers, Smartphones, "pad" or tablet computing devices, desktop computers, and other computing devices.

As illustrated in FIG. 10, the disclosed embodiments may be implemented in the context of a data-processing system 300 that can include, for example, a central processor 301 (or other processors), a main memory 302, a controller 303, and in some embodiments, a USB (Universal Serial Bus) 304 or other appropriate peripheral connection. System 300 can also include an input device 305 (e.g., a keyboard, pointing device such as a mouse, etc.), a display 306, and a HBO (Hard Disk Drive) 307 (e.g., mass storage). As illustrated, the various components of data-processing system 300 can communicate electronically through a system bus 310 or similar architecture. The system bus 310 may be, for example, a subsystem that transfers data between, for example, computer components within data-processing system 300 or to and from other data-processing devices, components, computers, etc.

FIG. 11 illustrates a computer software system 350, which may be employed for directing the operation of the data-processing system 300 depicted in FIG. 10. Software application 354, stored in memory 302 and/or on HDD 307 generally can include and/or can be associated with a kernel or operating system 351 and a shell or interface 353. One or more application programs, such as module(s) 352, may be "loaded" (i.e., transferred from mass storage or HOD 307 into the main memory 302) for execution by the data-processing system 300. In the example shown in FIG. 11, module 352 can be implemented as, for example, a software module that performs the logical instructions or operations of FIGS. 2 and 12 and so forth.

The data-processing system 300 can receive user commands and data through user interface 353 accessible by a user 349. These inputs may then be acted upon by the data-processing system 300 in accordance with instructions from operating system 351 and/or software application 354 and any software module(s) 352 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 352) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (e.g., accessible only to that module) and which includes source code that actually implements the routines in the module. The term module may also simply refer to an application such as a computer program designed to assist in the performance of a specific task such as word processing, accounting, inventory management, etc.

The interface 353 (e.g., a graphical user interface) can serve to display results, whereupon a user may supply additional inputs or terminate a particular session. In some embodiments, operating system 351 and interface 353 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 351 and interface 353.

FIGS. 10-11 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 12:
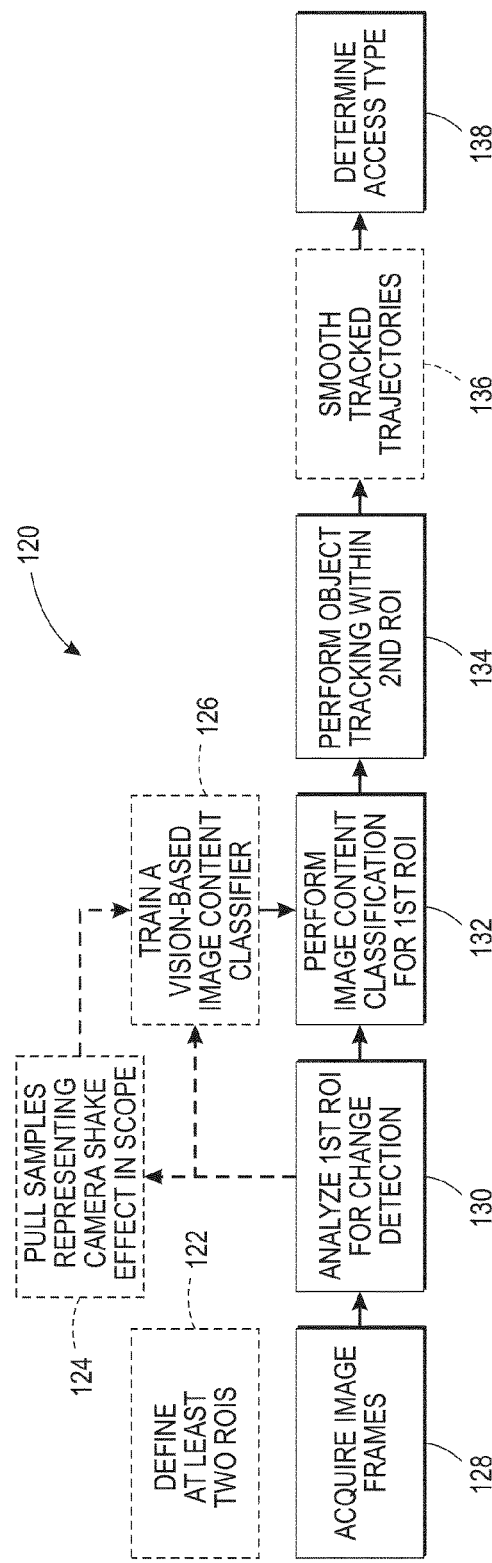
FIG. 12 illustrates a high-level flow chart of operations depicting logical operational steps of a method for video-/vision-based access control for parking occupancy determination, which is robust against camera shake, in accordance with an alternative embodiment.

FIG. 12 illustrates a high-level flow chart of operations depicting logical operations steps of a method 120 for video/vision-based access control for parking occupancy determination, which is robust against camera shake/vibration, in accordance with an alternative embodiment. The process shown in FIG. 12 is similar to that depicted in FIG. 2, but with some subtle differences. An operation can be implemented to define at least two ROIs as shown at block 122. Image frames can be acquired, as indicated at block 128 and then a first ROI can be analyzed for change detection as indicated at block 130. Samples can be pulled representing camera shake effect in scope, as shown at block 124. A vision based image content classifier can then be trained, as illustrated at block 126. Additionally, image content classification can be performed for the first ROI as shown at block 132. Object tracking within the second ROI can be performed as shown at block 134 followed by an operation for smooth tracked trajectories as shown at block 136. Finally, an operation can be implemented to determine access type, as shown at block 138.

Figure 13:
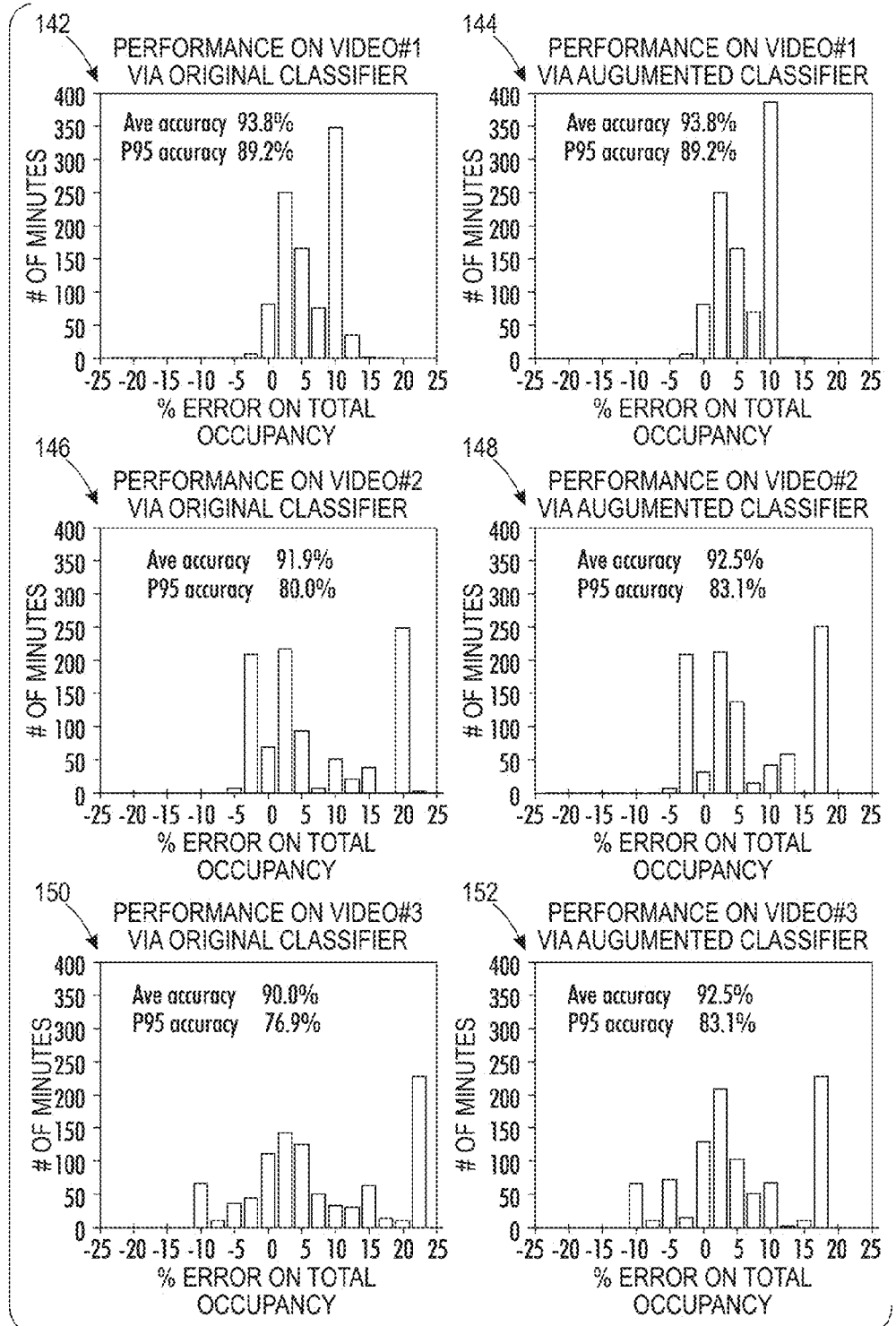
FIG. 13 illustrates sample graphs depicting data indicative of the performance of prior art approaches and the disclosed approach.

FIG. 13 illustrates sample graphs 142, 144, 146, 148, 150, 152 depicting data indicative of the performance of prior art approaches and the disclosed approach of method 120 showing FIG. 12. In general, FIG. 13 illustrates the performance of an original classifier and method 120 (e.g., an augmented classifier) with respect to particular videos, some of which are simulated videos.

Figure 14:
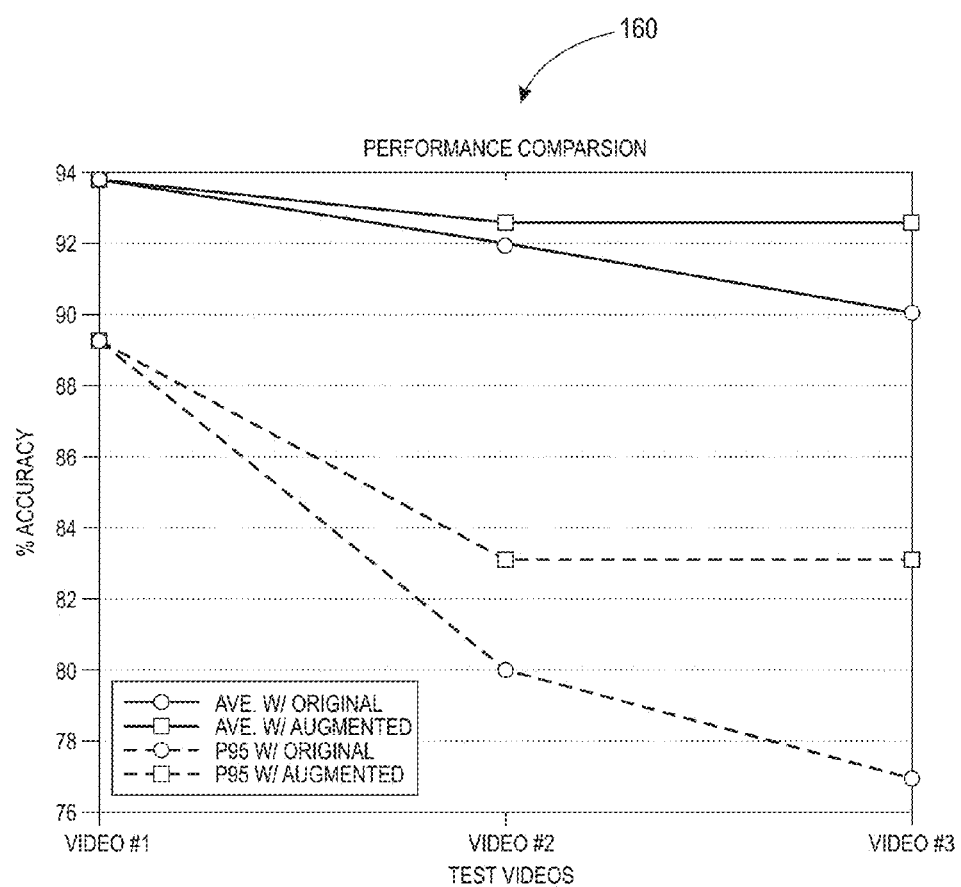
FIG. 14 illustrates a sample graph depicting data comparing performance based on a prior art approach and the new approach disclosed herein.

FIG. 14 illustrates a sample graph 160 depicting data comparing performance based on a prior art approach and the new approach disclosed herein. FIG. 14 demonstrates the comparison of accuracies using the two approaches. Graph 160 shown in FIG. 14 plots "% accuracy" (y-axis) vs. test videos (x-axis) including sample video. As can be seen, although method 120 shown in FIG. 12 cannot bring the accuracy back to the original level without camera shake, the improvement over previous methods is quite clear (e.g., up to 2.5% improvement on average accuracy and up to 6% improvement on P95 accuracy). The improvement is quite significant for this application.

Note that there are two definitions of the terms "test videos" as utilized herein. One version of "test video" relates to the process shown, for example, with respect to the method 20 shown in FIG. 2 and related embodiments thereof. The other version of "test video" relates to the embodiment of method 120 shown in FIG. 12 and the accompany example data depicted in FIGS. 13-14. Thus, the example shown in FIG. 13-14 associated with method 120 was applied in one experimental scenario to 13-hours of live video acquired at a pilot site on Mar. 29, 2013 and two simulated videos generated by simulated two levels/types of camera shake frame-to-frame into an original 13 hours live video. In this experimental example, two versions of vision-based classifiers were pre-trained using live-videos acquired from different days. The first ("original") version is created using the method(s) of, for example, U.S. patent application Ser. No. 13/963,200 to provide the baseline performance. On the other hand, the test video(s) illustrated and described herein with respect to the embodiment(s) related to method 20 of FIG. 2 are labeled with "ground-truth" by a human operator indicating the frame number, wherein an event of interest started (e.g., a vehicle entering or exiting a parking lot) so that the performance of method 20 can be assessed.

Based on the foregoing, it can be appreciated that a number of embodiments are disclosed. In one embodiment, for example, a method can be implemented for parking occupancy determination. Such a method can include, for example, the steps or logical operations of measuring changes in a field of view using template matching between templates derived from one or more original scenes and one or more current scenes with motion removed; and employing the changes measured in the field of view to adjust data indicative of one or more regions of interest for vision-based processing thereof if the changes measured are above a pre-determined threshold so that an impact of the changes with respect so the field of view to performance is minimized.

In another embodiment, the aforementioned templates can constitute one or more M×N sub-images derived from the original scene(s) and/or the current scene(s); and the template matching can be based on a normalized cross-correlation. In still another embodiment, the aforementioned templates can include one or more feature descriptions of one or more of the regions of interest, and the template matching include at least one of, for example: SIFT-matching, SURF-matching, and a normalized cross-correlation. In still another embodiment, a step or logical operation can be provided for defining the region(s) of interest as suitable for image registration thereof.

In another embodiment, a step or logical operation can be provided for automatically learning the templates from representative image templates of the region(s) of interest, the templates representing varying image content associated with the original scene(s). In still another embodiment, automatically learning can occur offline or may be updated online.

In another embodiment a step or logical operation can be implemented for performing the template matching between the templates learned with respect the original scene(s) and the current scene(s), wherein the motion is removed to determine optimal matches at a pre-determined schedule. In still another embodiment, the motion can be removed by at least one of the following steps: averaging the latest K frames; performing background estimation using a weight sum of a previous background and a current frame; and employing a Gaussian mixture model.

In another embodiment, a step or logical operation can be provided for applying diagnostics with respect to the field of view without compensation to assist in remotely repositioning a camera associated with the field view back to the original scene(s). In still another embodiment, steps or logical operations can be provided for tracking time of day data associated with the templates; and selectively performing image registration with respect to the templates based on the time of day data. In yet another embodiment, a step or logical operation can be performed for determining the amount and/or characteristics of the changes in the field of view if the template matching scores above the pre-determined threshold.

In another embodiment, steps or logical operations can be performed for deriving at least one pixel location with respect to the vision-based processing if the amount exceeds the pre-determined threshold; if the amount does not exceed the pre-determined threshold, leaving the at least one pixel location unchanged; acquiring video of an entrance to a parking lot utilizing one or more video cameras focusing on a pre-defined vision-based region of interest and a pre-defined video-based region of interest; video processing the video via a classifier pre-trained to take into account potential camera shake disturbances to generate video output data thereof; trajectory smoothing the video output data; and analyzing the video output data for parking lot occupancy data, wherein an impact of camera shake with respect to the at least one video camera is minimized.

In another embodiment, a system for parking occupancy determination can be implemented. Such a system can include, for example, a processor; and a computer-usable medium embodying computer program code, the computer-usable medium capable of communicating with the processor. The computer program code can include instructions executable by the processor and configured, for example, for: measuring changes in a field of view using template matching between templates derived from one or more original scenes and one or more current scenes with motion removed; and employing the changes measured in the field of view to adjust data indicative of one or more regions of interest for vision-based processing thereof if the changes measured are above a pre-determined threshold so that an impact of the changes with respect so the field of view to performance is minimized.

In still another embodiment, a processor-readable medium storing code representing instructions to cause a process for parking occupancy determination can be implemented. Such code can include code to, for example: measure changes in a field of view using template matching between templates derived from one or more original scenes and one or more current scenes with motion removed; and employ the changes measured in the field of view to adjust data indicative of one or more regions of interest for vision-based processing thereof if the changes measured are above a pre-determined threshold so that an impact of the changes with respect so the field of view to performance is minimized.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or processor-readable media. For example, a server can include one or more computers operating as a web server, database server, or other type of computer server in a manner to fulfill described roles, responsibilities, or functions. Within the context of this document, the disclosed devices, assemblies, and so forth are also deemed to include computing devices having a processor and a non-transitory memory storing instructions executable by the processor that cause the device to control, manage, or otherwise manipulate the features of the assemblies.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for parking occupancy determination, said method comprising:

measuring changes in a field of view using template matching between templates learned from at least one original scene and templates learned from at least one current scene with motion removed, wherein said at least one current scene with motion removed comprises a motion-removed current scene;

employing said changes measured in said field of view to adjust data indicative of at least one region of interest for vision-based processing thereof if said changes measured are above a pre-determined threshold so that an impact of said changes with respect to said field of view to performance is minimized; and applying diagnostics with respect to said field of view without compensation to assist in remotely repositioning a camera associated with said field of view back to said at least one original scene, wherein said templates comprise at least one M×N sub-image derived from said at least one original scene and said at least one current scene with said motion removed; and said template matching is based on a normalized cross-correlation value as a similarity metric, wherein at run-time each image template among said templates slides against said motion-removed current scene and a location is determined, which yields a highest normalized cross-correlation value, said normalized cross-correlation value comprising said highest normalized cross correlation value.

2. The method of claim 1 wherein:
said templates comprise a set of interest points and at least one corresponding feature description of said at least one region of interest; and
said template matching is selected from a group of template matching comprising SIFT-matching and SURF-matching and wherein said template matching is applied in a feature space that includes said at least one corresponding feature description; and
deriving a final matched location from said template matching based on coordinates of matched interest points including at least some interest points among said set of interest points and based on a distortion/image-registration model comprising offsets, scaling, shearing rotation, and a projective transform.

3. The method of claim 1 further comprising automatically learning said templates from representative image templates of said at least one region of interest, said templates representing varying image content associated with said at least one original scene.

4. The method of claim 3 further comprising performing said template matching between said templates learned with respect to said at least one original scene and said at least one current scene with said motion removed, wherein said motion is removed to determine optimal matches at a pre-determined schedule.

5. The method of claim 4 wherein said motion is removed by averaging K frames comprising a most recent set of K frames.

6. The method of claim 4 wherein said motion is removed by background estimation using a weight sum of a previous background and a current frame of said at least one current scene with said motion removed.

7. The method of claim 6 wherein said motion is removed by a Gaussian mixture model.

8. The method of claim 6 further comprising:
tracking time of day data associated with each of said templates; and
selectively performing image registration with respect to said templates based on said time of day data with respect to said each of said templates.

9. A system for parking occupancy determination, said system comprising:
a processor; and
a non-transitory computer-usable medium embodying computer program code, said computer-usable medium capable of communicating with the processor, said computer program code comprising instructions executable by said processor and configured for:
measuring changes in a field of view using template matching between templates learned from at least one original scene and templates learned from at least one current scene with motion removed, wherein said at least current scene with motion removed comprises a motion-removed current scene;
employing said changes measured in said field of view to adjust data indicative of at least one region of interest for vision-based processing thereof if said changes measured are above a predetermined threshold so that an impact of said changes with respect to said field of view to performance is minimized; and
applying diagnostics with respect to said field of view without compensation to assist in remotely repositioning a camera associated with said field of view back to said at least one original scene, wherein said templates comprise at least one M×N sub-image derived from said at least one original scene and said at least one current scene with said motion removed; and
said template matching is based on a normalized cross-correlation value as a similarity metric, wherein at run-time each image template among said templates slides against said motion-removed current scene and a location is determined, which yields a highest normalized cross-correlation value, said normalized cross-correlation value comprising said highest normalized cross correlation value.

10. The system of claim 9 wherein:
said templates comprise a set of interest points and at least one corresponding feature description of said at least one region of interest; and
said template matching comprises SIFT-matching and wherein said template matching is applied in a feature space that includes said at least one corresponding feature description; and
a final matched location is derived from said template matching based on coordinates of matched interest points including at least some interest points among said set of interest points and based on a distortion/image-registration model comprising offsets, scaling, shearing rotation, and a projective transform.

11. The system of claim 10 wherein said instructions are further configured for defining said at least region of interest as suitable for image registration facilitated by said distortion/image registration model performed online for every K frames rather than every frame.

12. The system of claim 10 herein said instructions are further configured for automatically learning said templates from representative image templates of said at least one region of interest, said templates representing varying image content associated with said at least one original scene.

13. The system of claim 12 wherein said automatically learning occurs offline and is updated online.

14. The system of claim 12 wherein said instructions are further configured for performing said template matching between said templates learned with respect to said at least one original scene and said at least one current scene said motion removed to determine optimal matches at a pre-determined schedule.

15. The system of claim 14 wherein said instructions are further configured for: determining an amount and characteristics of said changes in said field of view if said template matching scores above said pre-determined threshold.

16. A non-transitory processor-readable medium storing code representing instructions to cause a process for parking occupancy determination, said code comprising code to:
measure changes in a field of view using template matching between templates learned from at least one original scene and templates learned from at least one current scene with motion removed, wherein said at least current scene with motion removed comprises a motion-removed current scene;
employ said changes measured in said field of view to adjust data indicative of at least one region of interest for vision-based processing thereof if said changes measured are above a pre-determined threshold so that an impact of said changes with respect to said field of view to performance is minimized;
apply diagnostics with respect to said field of view without compensation to assist in remotely repositioning a camera associated with said field of view back to said at least one original scene, wherein each of said templates comprise at least one M×N sub-image derived from said at least one original scene and said at least one current scene with said motion removed and wherein said template matching is based on a normalized cross-correlation value as a similarity metric, wherein at run-time each image template among said templates slides against said motion-removed current scene and a location is determined, which yields a highest normalized cross-correlation value, said normalized cross-correlation value comprising said highest normalized cross correlation value.

* * * * *